US010864637B2

(12) United States Patent
Magnanimo et al.

(10) Patent No.: US 10,864,637 B2
(45) Date of Patent: Dec. 15, 2020

(54) PROTECTIVE-FIELD ADJUSTMENT OF A MANIPULATOR SYSTEM (71) Applicant: KUKA Roboter GmbH, Augsburg (DE)

(72) Inventors: Vito Magnanimo, Augsburg (DE); Steffen Walther, Munich (DE)

(73) Assignee: KUKA Roboter GmbH, Augsburg (DE)

(*) Notice: Subject to any disclaimer, the term of this patent is extended or adjusted under 35 U.S.C. 154(b) by 363 days.

(21) Appl. No.: 15/769,900

(22) PCT Filed: Oct. 17, 2016

(86) PCT No.: PCT/EP2016/074851
§ 371 (c)(1),
(2) Date: Apr. 20, 2018

(87) PCT Pub. No.: WO2017/067876
PCT Pub. Date: Apr. 27, 2017

(65) Prior Publication Data
US 2018/0326586 A1 Nov. 15, 2018

(30) Foreign Application Priority Data
Oct. 21, 2015 (DE) .................. 10 2015 220 495

(51) Int. Cl.
G06F 17/00 (2019.01)
B25J 9/16 (2006.01)
(Continued)

(52) U.S. Cl.
CPC ............. B25J 9/1676 (2013.01); B25J 19/06 (2013.01); F16P 3/144 (2013.01); G05B 2219/49138 (2013.01)

(58) Field of Classification Search
CPC .......... B25J 9/1676; B25J 19/06; F16P 3/144; G05B 2219/49138
(Continued)

(56) References Cited

U.S. PATENT DOCUMENTS 9,894,327 B1* 2/2018 Jacob ..................... H04N 7/185
2006/0167595 A1* 7/2006 Breed ............... B60R 21/01536
701/1
(Continued)

FOREIGN PATENT DOCUMENTS

CN 102903258 A 1/2013
DE 10324627 A1 1/2005
(Continued)

OTHER PUBLICATIONS

The English translation of the International Search Report and Written Opinion, dated Feb. 6, 2017, in the corresponding PCT Appl. No. PCT/EP2016/074851.

Primary Examiner — Ronnie M Mancho (57) ABSTRACT

A method for operating a manipulator system, that includes a driverless transport system having a driverless transport vehicle. A protected field of the manipulator system is monitored by a monitoring device. Environment information of the manipulator system, including for example an orientation, position, movement, and/or state of an object or an obstacle in the environment, is obtained and used to adjust the protected field.

15 Claims, 4 Drawing Sheets (51) Int. Cl.
  *B25J 19/06*          (2006.01)
  *F16P 3/14*           (2006.01)

(58) Field of Classification Search
  USPC .......................................................... 700/253
  See application file for complete search history.

(56) References Cited

U.S. PATENT DOCUMENTS

| | | | |
|---|---|---|---|
| 2006/0208169 A1* | 9/2006 | Breed ................. | G06K 9/00624 |
| | | | 250/221 |
| 2007/0154063 A1* | 7/2007 | Breed ............... | B60R 21/01538 |
| | | | 382/100 |
| 2007/0193811 A1* | 8/2007 | Breed ................. | B60R 21/0152 |
| | | | 180/271 |
| 2008/0157940 A1* | 7/2008 | Breed .................... | B60N 2/853 |
| | | | 340/425.5 |
| 2008/0195261 A1* | 8/2008 | Breed .................. | B60N 2/0232 |
| | | | 701/2 |
| 2008/0294315 A1* | 11/2008 | Breed .................... | E05F 15/431 |
| | | | 701/49 |
| 2009/0043440 A1 | 2/2009 | Matsukawa et al. | |
| 2009/0046538 A1* | 2/2009 | Breed .................... | B60R 25/102 |
| | | | 367/93 |
| 2011/0050878 A1* | 3/2011 | Wells ..................... | H04N 7/181 |
| | | | 348/86 |
| 2012/0025964 A1* | 2/2012 | Beggs ...................... | B60Q 1/26 |
| | | | 340/435 |
| 2013/0338525 A1 | 12/2013 | Allen | |
| 2014/0320392 A1* | 10/2014 | Chizeck .................. | G06F 3/016 |
| | | | 345/156 |

FOREIGN PATENT DOCUMENTS

| | | |
|---|---|---|
| DE | 102010007025 A1 | 8/2011 |
| DE | 102010007027 A1 | 8/2011 |
| DE | 102010046327 A1 | 3/2012 |
| EP | 2048557 A1 | 4/2009 |
| EP | 2378445 A1 | 10/2011 |
| EP | 2380709 A2 | 10/2011 |
| WO | 2016078093 A1 | 5/2016 |

\* cited by examiner

PROTECTIVE-FIELD ADJUSTMENT OF A MANIPULATOR SYSTEM

CROSS-REFERENCE TO RELATED APPLICATIONS

This application is a National Stage Application of PCT/EP2016/074851 filed Oct. 17, 2016, which claims priority from German Patent Application No. 10 2015 220 495.7 filed Oct. 21, 2015.

1. TECHNICAL FIELD

The present invention relates to a method for operating a manipulator system, which in particular can include a driverless transport system, and wherein a protective field of the manipulator system is monitored by a monitoring device. Further, the invention relates to a relevant manipulator system.

2. TECHNICAL BACKGROUND

Driverless transport systems (DTS) are often used in manufacturing facilities in order to transport, for example, components or workpieces from one work station to the next work station. A driverless transport system can have its own drive and is automatically controlled. Driverless transport systems can also be used to move manipulators or industrial robots, so that it can perform certain work-steps at different workstations.

In general, a driverless transport system can be considered as a conveying system, which can comprise at least one driverless transport vehicle. The vehicle can thereby be multi-directionally and, in particular, omni-directionally movable. For this purpose, it can have relevant omni-directional wheels to enable the driverless transport system to be highly movable and flexible.

Driverless transport systems are automatically controlled. For this purpose, for example, an in-vehicle control device can be used, which drives the relevant drive units of the driverless transport system in order to effectuate a desired movement of the vehicle. The control device can be based on a program, which predefines the motion of the vehicle, characterized by direction and speed.

To enable a safe operation of a driverless transport system in a workshop, it is often equipped with laser scanners, which can monitor a so-called protective field (often called safety area or safety region). In particular, a protective field can cover a horizontal area around the driverless transport system. For example, if an obstacle, such as a person, enters the protective field, an infringement of the protective field can be recognized or detected by means of laser scanners. In response, the driverless transport system can stop to avoid a possible collision. Thus, a safe human-robot-collaboration (HRC) is made possible.

The protective fields of a laser scanner are usually offline, so, configured once, for example, at the time when putting a driverless transport system into operation. Here, several configurations of the protective field can be stored, [and] can be switched between them during operation. However, the number of pre-configured protective fields is limited, because systematically in general not any number of protective fields can be defined and stored in advance.

It is known to switch protective fields based on the velocity of the driverless transport system. For example, at a high speed of the driverless transport system, a larger protective field is used to account for delays and longer braking distances. However, a protective field adjustment depending on the environment of a driverless transport system is not known.

In document DE 10 2010 046 327 A1 of the applicant, which is hereby incorporated by reference in its entirety herein, a method for monitoring a manipulator is proposed, wherein a monitoring device in the first operating mode of the manipulator supervised the first safety area and in the second operating mode of the manipulator did the second safety area different from the first.

EP 2 378 445 A1, which is hereby incorporated by reference in its entirety herein, proposes a system for safety-technical planning of an industrial plant with hazardous potential. In this case, a hazard analysis in virtual operation due to a process visualization or simulation is feasible to avoid a future accident.

However, it is still necessary to make the safest use of a driverless transport system possible.

These and other tasks, which will become apparent from the following description, are achieved by a method according to claim 1 and a system according to claim 12.

3. CONTENTS OF THE INVENTION

The present invention relates to a method for operating a manipulator system. The manipulator system can comprise a manipulator, which can, in particular, have a mobile base. Preferably, the manipulator system comprises a driverless transport system and, in particular, a driverless transport vehicle, which can preferably carry and move a manipulator. The manipulator system is more preferably designed as a manipulator with a mobile base. The person skilled in the art understands that a manipulator can consist of a number of movable members or axes linked to each other, and that it can form a mechanism of a robot. In turn, a robot can be a freely programmable and program-controlled device.

The protective field of the manipulator system is monitored by means of a monitoring device. By monitoring the protective field, it can be detected, for example, that an object or an obstacle is in the protective field, and a relevant reaction of the manipulator system can possibly be initiated. A monitoring device preferably comprises a means, which allows, for example, to monitor the protective field, using infrared, ultrasonic, parallactic or sharp- or contrast optical distance measurement of the protective field. The monitoring device can use optical, opto-electronic, and/or image processing systems for this purpose. Preferably, the monitoring device can comprise a multi-camera system, a stereo-camera, a 3D-camera and/or a time-of-flight camera to allow to monitor the protective field. More preferably, the monitoring device comprises one or more laser scanners for detecting objects in the protective field. Such laser scanners work reliably and are to meet high safety requirements. Generally, a detectable object can be anything, which occupies a certain space in the environment of the manipulator system and can be captured by means of the monitoring device or can be detected by it. The monitoring device does not need to recognize or identify objects, but it is sufficient for a safe use of the manipulator system that only the presence of an object in the protective area is detected.

In this case, the method comprises providing environment information concerning the environment of the manipulator system. The environment information can comprise information about the known obstacles in the environment of the manipulator system. For example, the environment information can describe a size, an orientation, a position, a movement, and/or the state of an object or an obstacle in the environment. These known obstacles can already be considered when programming the manipulator system, so that a collision of the manipulator system with these known obstacles is excluded by path planning. An unknown obstacle can be an object, which was not considered at the time of manipulator system programming or could not be considered.

Further, the method comprises the adjustment of a protective field based on the environment information, and the monitoring of the adjusted protective field by means of a monitoring device. The protective field can be at least partially adjusted to the environment of the manipulator system to enable a flexible protection of the manipulator system.

It is thus advantageously possible to adjust the protective field to be monitored in consideration of the environment information, during the operation of the manipulator system, or preferably, of the driverless transport system. For example, a protective field can be reduced or increased, depending on the environment information. Thus, the protective field can be flexibly adjusted to allow a flexible use of the manipulator system ultimately. The possible application of the manipulator system is not restricted. Thus, for example, in consideration of the known obstacles in the environment of the manipulator system, the protective field can be adjusted in such a way as an infringement of the protective field cannot be done due to the known obstacles. Optimum safety is nonetheless guaranteed, as unknown obstacles, such as a person penetrating the protective field, trigger a protective field infringement, which is recognized by the monitoring device.

Preferably, the adjustment of a protective field is still based on a speed of the manipulator system. Thus, in addition to the environment information, which describes the environment of the manipulator, the momentum of the manipulator system is considered for the adjustment of a protective field optimally.

Preferably, providing environment information and/or adjusting a protective field takes place during a movement of the manipulator system. Therefore, it is advantageous not to interrupt a program-process. The skilled person in the art understands that these steps can also be carried out during a standstill of the manipulator system.

Preferably the environment information comprises an environment map and the current position of the manipulator system. The environment map can comprise obstacles, objects or bodies, such as walls, columns, tables, workstations, corridors, etc. The environment map does not need to describe the complete environment of the manipulator system, but it can at least include information about obstacles near the manipulator system. In the environment map, a size, an orientation, and/or a position of an object or an obstacle in the environment can be described. The current position of the manipulator system can be defined, in particular, with respect to the environment map. In particular, the current position can also describe an orientation of the manipulator system. Based on the environment map and the current position of the manipulator system, the protective field can be efficiently adjusted, since, for example, the known obstacles can be excluded from the protective field, so that they do not lead to an infringement of the protective field. Further, also based on the relative position of the manipulator system to an obstacle known from the environment map, the adjustment of a protective field is possible, so that unwanted protective field infringements due to the known obstacles do not occur.

More preferably, the environment map comprises structural information of at least one known object in the environment. In this case, the structural information can describe the extent, size, position, or other structural features of the known object. This known object can be, for example, a known obstacle, and present as a spatial body in the environment. The adjustment of a protective field then takes place in such a way as the protective field spares at least the known object. Thus, only unknown objects in the protective field can lead to a safety reaction of the manipulator system, but the known objects cause no protective field infringement and related safety reactions. It can thus be checked whether there is a known obstacle in the protective field, and this can be possibly cut out of the protective field, so that it does not result in an unwanted reaction in operation. Preferably, such objects as are immobile or at least for a longer period of time firmly localized in the environment are cut out of the protective field. Even movable or frequently moving objects can be cut out of the protective field, but a regularly updated environment map should be provided to the manipulator system.

More preferably, the adjustment of a protective field also further takes place in such a way as the protective field also spares an area shaded by a known object. It is thus possible to particularly cut out those areas, which can no longer be monitored by the monitoring device because of obstacles. For example, an area behind a known column, which cannot be seen by a laser scanner, can be cut out of the protective field. Thus, the protective field can be reduced by those areas that are not visible to the used monitoring device and are shaded by the known objects. Therefore, those areas can be cut, which cannot be monitored by a monitoring device due to the known objects in the environment.

The adjustment of a protective field can preferably be carried out quasi-continuously. Preferably, the adjustment process can be repeated at each time-step. More preferably, the adjustment of a protective field can take place at every clocking step of the system. As a result, an optimal safety configuration of the manipulator system is guaranteed for each time point. In particular, it can be guaranteed that the known objects do not lead to a protective field infringement. Depending on the complexity and the desired accuracy of monitoring, the adjustment of a protective field according to the invention can be carried out at defined times or at desired intervals.

Preferably, providing environment information comprises the detection of an adjustment signal. An adjustment signal can be characteristic for the environment of the manipulator and enable an efficient adjustment of a protective field in consideration of the environment. The adjustment signal can be suitable for controlling the adjustment of a protective field. Preferably, an adjustment signal is transmitted as a wireless signal. Here, the adjustment signal can be safely transmitted via wireless or IR technology.

More preferably, the detection of an adjustment signal comprises the reception or wireless reception of the adjustment signal, wherein the adjustment signal can be wirelessly sent from a stationary transmitter. This stationary transmitter does not need to be part of the manipulator system.

In particular, the stationary transmitter can be separately provided by a manipulator or driverless transport system, for example, fixed in the environment of the manipulator system. A stationary transmitter can, for example, be provided at an obstacle in the environment of the manipulator system, and it can send out an adjustment signal by means of wireless technology and transmit it to the manipulator system. When the manipulator system wirelessly receives an adjustment signal, the adjustment signal, which can be descriptive for the obstacle, can adjust the protective field.

More preferably, an adjustment signal is wirelessly sent based on the provided position data of the manipulator system. The position of the manipulator system can be determined, for example, by means of GPS technology, an electromagnetic logic or by means of RFID tags. A switching logic can decide based on the position of the manipulator system whether to send an adjustment signal. Thus, the adjustment of a protective field can be designed efficiently and situationally by means of an adjustment signal, depending on the position of the manipulator system in a known environment, that is, for example, depending on the relative position of the manipulator system to a known obstacle.

More preferably, an adjustment signal is cyclically sent in a short range wirelessly. Thus, the adjustment signal can be short-range and can be received only within a limited distance. For example, a stationary transmitter can be provided near an obstacle, and periodically send out a short-range adjustment signal, which can control the adjustment of a protective field with respect to the obstacle. When the manipulator system is within a reception range, the adjustment signal can be detected, and the protective field can be adjusted accordingly.

More preferably, an adjustment signal can control the adjustment of a protective field at a defined position of the manipulator system. For this purpose, an adjustment signal can be transmitted, for example, once to the manipulator system, and specifications include when or where the adjustment of a protective field is to be made. In consideration of the current position of the manipulator system, which can be determined continuously, for example, by means of GPS technology, the initiation of the adjustment of a protective field can be accurately controlled.

More preferably, the detection of an adjustment signal comprises the scanning of the adjustment signal. An adjustment signal can be in the form of an external marking, which can be applied, for example, close to an obstacle on the ground. The marking can be electromagnetic type, comprise an RFID-tag, or be in the form of a barcode or QR code. Thus, it can be accurately identified where and how the protective field to be adjusted depending on the position of the manipulator system in the environment.

Preferably, the adjustment of a protective field includes switching to a predefined protective field. By means of adjustment signals, an environment specific protective field can thus be selected and used. This is particularly advantageous in the case of frequently recurring protective field adjustments, for example, when a narrower protective field should be used with a corridor-passage of the manipulator system.

Furthermore, the present invention relates to a manipulator system comprising, in particular, a driverless transport system, and further in particular, a driverless transport vehicle, which can preferably carry and move a manipulator. The manipulator system comprises a monitoring device, which is set up to monitor a protective field of the manipulator system. Further, the manipulator system comprises a control device, which is set up to carry out the above described method for operating the manipulator system. For this purpose, the manipulator system can comprise a relevant means, which allows the described operation of the manipulator system and, in particular, the described protective field to be adjusted.

The term control device is to be understood broadly as it can include many, even locally installed control devices, such as computers. In particular, it can comprise several different control devices, such as a control device for controlling a driverless transport system and a control device for controlling a manipulator, which is carried by the driverless transport system. Alternatively, the control device can consist of only a single suitable control device. The individual steps of the method can thereby be stored on a computer readable medium.

The monitoring device preferably comprises laser scanners for detecting objects in the protective field. Such laser scanners work reliably and are to meet high safety requirements. The manipulator system preferably comprises a means for determining the current position of the manipulator system, which can be based on GPS technology. More preferably, the monitoring device can also be used for an accurate position determination of the manipulator system.

Preferably, the manipulator system comprises a means for detecting an adjustment signal.

Preferably, a stationary transmitter for wirelessly transmitting an adjustment signal to the means for detecting the adjustment signal is provided, and the means for detecting the adjustment signal comprises a receiver. Preferably, the means for detecting an adjustment signal comprises a scanner, which is set up to scan an external marking. An adjustment signal can preferably be in the form of an external marking.

Preferably, the manipulator system comprises a manipulator and a driverless transport system carrying the manipulator. The manipulator-protective field of the manipulator and the DTS protective field of the driverless transport system are monitored and adjusted. Thus, different protective fields for the driverless transport system and the manipulator can be treated separately. For example, it can thus be possible that a driverless transport system perceives a work table as an obstacle, but a manipulator carried by the driverless transport system does not recognize the table as an obstacle and thus can perform a desired movement.

Both protective fields of the manipulator and the driverless transport system can also be combined in a common protective field. In particular, a binary identification or an indication of the height of obstacles can be provided to allow selective consideration of the protective field by the manipulator and the driverless transport system.

4. BRIEF DESCRIPTION OF DRAWINGS

Hereinafter, the present invention will be described in detail with reference to the accompanying figures. In the figures, like parts are designated by like reference numerals. It shows.

5. DESCRIPTION OF PREFERRED EXEMPLARY EMBODIMENTS

Figure 1:
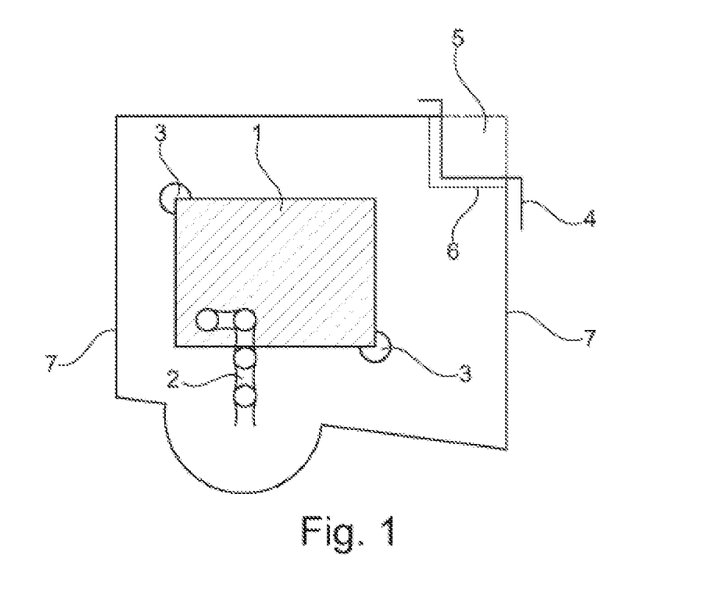
FIG. 1 is a manipulator system with an adjusted protective field according to an embodiment.

FIG. 1 shows a manipulator system, which comprises a driverless transport system 1 and a manipulator 2 mounted thereon. At the driverless transport system 1, two laser scanners 3 are provided, which monitor a protective field 7. Objects, which are present in the protective field 7, cause protective field infringements. These infringements can be output as binary signals, causing an emergency stop or other reactions of the manipulator system.

Further, in FIG. 1 an obstacle 4 is shown, which can be, for example, a wall. The obstacle 4 is, in particular, a known obstacle in the environment of the manipulator system. This obstacle is thus known and can be marked or identified in an environment map. According to the invention, a region 5 covered by the obstacle is cut based on this environment map. Thereby, this results in the illustrated protective field boundary 6, which runs along the contour of the obstacle 4.

Figure 2:
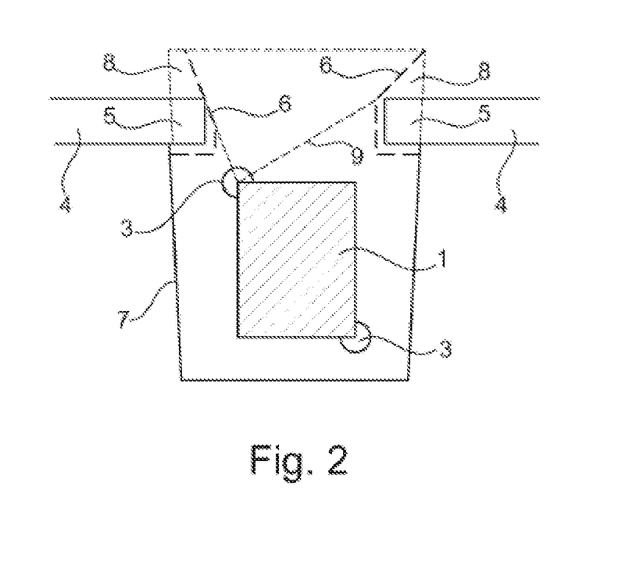
FIG. 2 is a manipulator system with an adjusted protective field according to another embodiment.

FIG. 2 also shows a driverless transport system 1, in which two laser scanners 3 are provided. The obstacle 4 is here in the form of a passage or an open door. The obstacle 4 is known again, and can be identified in an environment map, which can be provided as environmental information.

Based on the environment information, at least the area 5 is cut out of the protective field 7, in which the obstacle 4 is found. Furthermore, since certain areas behind obstacles, such as a door, are not visible through the laser scanner, area 8 shaded by the obstacle 4 is also cut out of the protective field, as this area 8 is not visible through the laser scanner 3.

One way to easily determine the areas not visible through the laser scanner can be checking whether there is a connection line from each point within the protective field to each sensor or laser scanner, wherein the connection line must lie completely in the protective field. In particular, it can be checked whether such a connection line exists from each point along a traverse, which forms the outer boundary of a protective field. FIG. 2 schematically shows a relevant connection lines 9. As a result of the check, it provides an adjusted protective field with an environment-specific protective field boundary 6.

Figure 3:
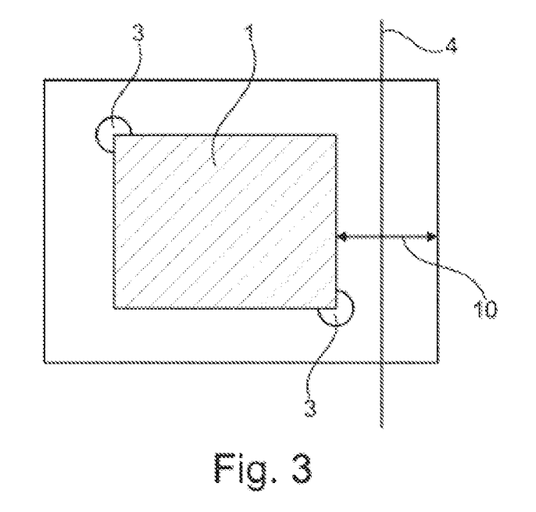
FIG. 3 is a manipulator system with an adjusted protective field according to another embodiment.

In FIG. 3, an obstacle 4 is presented in the form of a wall, wherein the manipulator system 1 initially complies with a minimum-safety area. When the manipulator system 1 moves toward a known object, the protective field 7 can be getting smaller as progressively approaching [the object], as described above, and thereby always fully secure the maximum distance to the obstacle. For better flexibility, a minimum size 10 of the protective field can be defined, so that the protective field is reduced only to a certain minimum size, and the manipulator system does not drive into the obstacle. In the situation illustrated in FIG. 3, the protective field 7 is not reduced continuously during an approach, but only up to the minimum size 10. By another approach to the obstacle 4, as shown in FIG. 3, the obstacle 4 comes into the protective field 7 with the minimum size 10, so that this is advantageously infringed and a further approach to the obstacle can be prevented.

Figure 4:
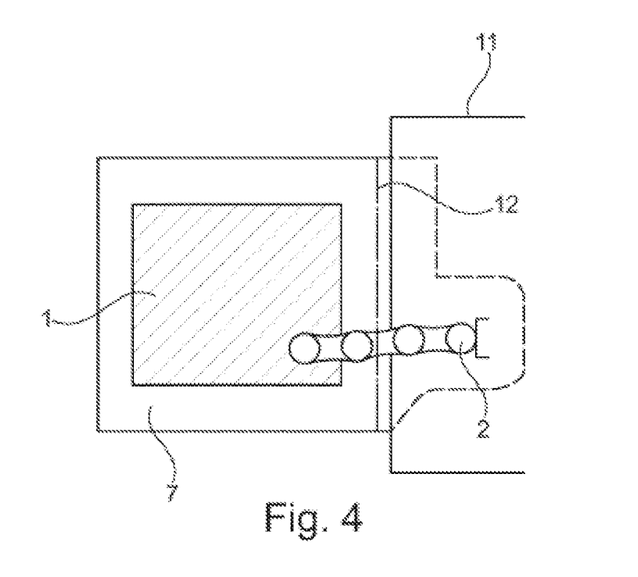
FIG. 4 is a manipulator system with an adjusted protective field according to another embodiment.

In FIG. 4, a work table 11 is shown, on which an operation step is to be carried out. This work table 11 is listed as an obstacle in the environment map at least for the driverless transport system 1. The driverless transport system 1 should not drive into this work table 11. During an approach of the driverless transport system 1 to the work table 11, the relevant protective field 7 of the driverless transport system 1 is cyclically adjusted or reduced, so that this protective field 7 is not infringed by the work table 11.

However, the manipulator 2, provided on the driverless transport system 1, should not perceive the work table 11 as an obstacle in order to carry out an operation step on this work table 11. To this end, in an environment map, certain areas are identified as an irrelevant obstacle for the manipulator 2, among others, the worktable 11. This can be done by a binary marking or also by the specification for the height of obstacles. Obstacles with an appropriate marking can infringe the minimum extent of the protective field and reduce this further. Thus, the manipulator 2 can carry out work on the work table 11, but this is no longer protected by the safety sensors or laser scanners. The skilled person in the art understands that the manipulator 2 can additionally be protected by other protection mechanisms.

Furthermore, for example, hanging obstacles can also be considered as obstacles to the manipulator 2, while the driverless transport system 1 can drive through under these obstacles. Such obstacles are then marked as irrelevant to the transport system 1.

Figure 5:
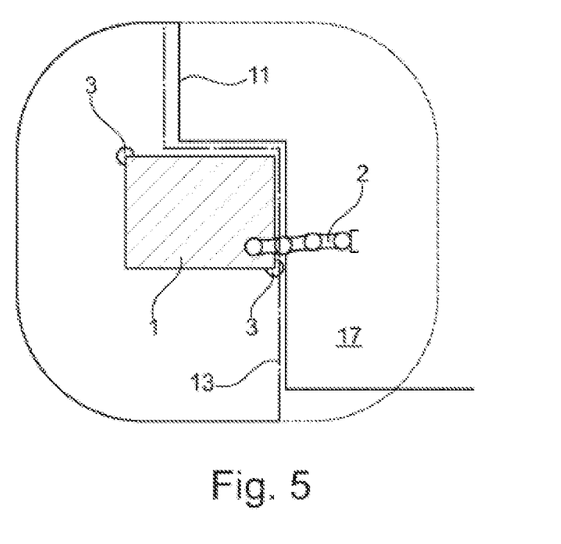
FIG. 5 is a manipulator system with an adjusted protective field according to another embodiment.

FIG. 5 shows another embodiment, in which a stationary operation is protected. Here protecting a stationary workstation can also be carried out with the laser scanners during a work step of the manipulator. In this case, an adjusted protective field to the known environment contour can be calculated, or an optimal protective field can be determined without consideration of the environment, from which the subsequently known contours of the work station 17 can be cut. In the situation illustrated in FIG. 5, the work table 11 or the workstation 17 is spared from the ideal protective field because there are no unknown obstacles, for example, no people, found or stopped. Thus, this results in a protective field 13, which extends along the contour of the work table 11.

The monitoring of a manipulator system is thus no longer limited by a limited number of possible configurations of a protective field. On the contrary, a dynamic adjustment of a protective field can be carried out continuously during the operation of the manipulator system. The protective field can be continuously and dynamically adjusted online using environment information. Approaches to the known objects, passages of narrow corridors, and safeguard of accessibility to workstations are possible by the safety sensors. Also, manipulators mounted on driverless transport systems, in consideration of the known obstacles and their significance for the working space of the manipulator, are flexibly protected.

Figure 6:
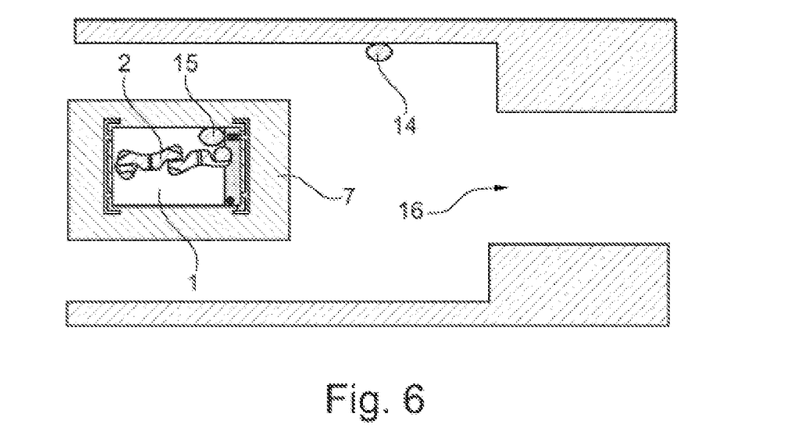
FIG. 6 to FIG. 8 schematically shows a method for operating a manipulator system according to another embodiment.
Figure 7:
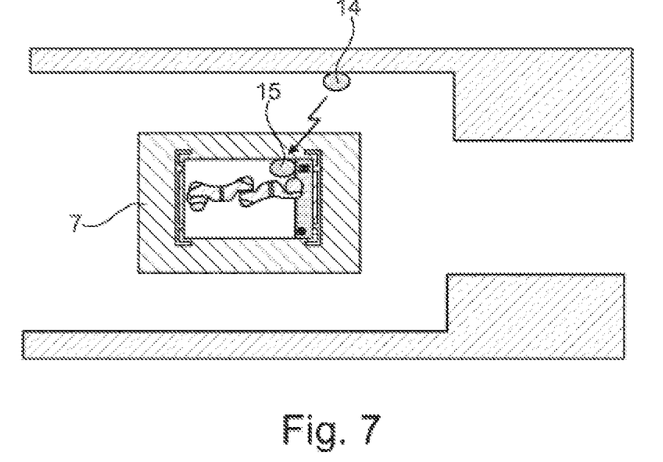
Figure 8:
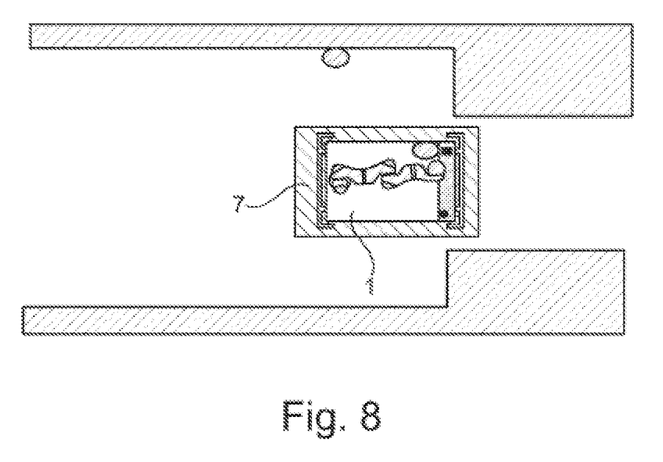

In the embodiments of FIGS. 6-8, a manipulator system is shown, comprising a driverless transport system 1 and a manipulator 2 mounted thereon. The driverless transport system 1 moves toward a narrow corridor 16, and this should happen. In the situation shown in FIG. 6, the protective field 7 of the manipulator system is too large to pass through the corridor 16, and it would be infringed in a drive-through.

Further, in the embodiment of the FIGS. 6-8, a transmitter 14 is provided, which is stationarily fixed in the environment. This sends a signal, when the manipulator system is near the transmitter 14. At the manipulator system, a relevant receiver 15 is provided, which can detect a signal.

In the situation of this embodiment shown in FIG. 7, the manipulator system has approached the transmitter 14 and the corridor 16. As a result of the approach, the signal or adjustment signal, which is sent from the transmitter 14 to the manipulator system, is received by the receiver 15. In response to this adjustment signal, the protective field 7 is reduced, as shown in FIG. 8. The adjustment signal can thereby cause a protective field, adjusted to the corridor, here a narrower protective field, to be used.

As can be seen in FIG. 8, now the smaller protective field 7 of the manipulator system is monitored, which is adjusted to the corridor, so that the manipulator system can pass the corridor without causing a protective field infringement.

The person skilled in the art understands that the elements of the embodiment of FIGS. 6-8 can be combined with the elements of the embodiments of FIGS. 1-5 in order to enable an optimum protective field adjustment according to the present invention in accordance with each application.

The invention claimed is:

1. A method for operating a manipulator system including a driverless transport system (DTS) having a driverless transport vehicle, wherein a protective field of the manipulator system is monitored by a monitoring device, the method comprising:
 providing environment information regarding the environment of the manipulator system;
 adjusting the protective field based on the environment information; and
 monitoring the adjusted protective field by means of the monitoring device,
 wherein the environment information comprises an environment map and a current position of the manipulator system,
 wherein the environment map comprises structure information of at least one known object in the environment, and
 wherein the adjustment of a protective field is carried out so that the protective field spares the at least one known object.

2. The method according to claim 1, wherein the step of adjusting the protective field is further carried out based on a speed of the manipulator system.

3. The method according to claim 1, wherein at least one of the steps of providing environment information or adjusting the protective field is carried out during a movement of the manipulator system.

4. A method for operating a manipulator system including a driverless transport system (DTS) having a driverless transport vehicle, wherein a protective field of the manipulator system is monitored by a monitoring device, the method comprising:
 providing environment information regarding the environment of the manipulator system;
 adjusting the protective field based on the environment information; and
 monitoring the adjusted protective field by means of the monitoring device,
 wherein the environment information comprises an environment map and a current position of the manipulator system,
 wherein the environment map comprises structure information of at least one known object in the environment, and
 wherein the adjustment of a protective field is carried out so that the protective field spares the at least one known object,
 wherein the environment map further comprises structure information of at least an additional known object, and
 wherein the adjustment of a protective field is further carried out, so that the protective field additionally spares areas shadowed by the known objects.

5. The method according to claim 1, wherein providing environment information comprises the detection of an adjustment signal.

6. The method according to claim 5, wherein the detection of the adjustment signal comprises a wireless reception of an adjustment signal, wherein the adjustment signal is sent wirelessly from a stationary transmitter.

7. The method according claim 6, wherein the adjustment signal is wirelessly sent based on the provided position data of the manipulator system or is cyclically sent with short range wirelessly.

8. A method for operating a manipulator system including a driverless transport system (DTS) having a driverless transport vehicle, wherein a protective field of the manipulator system is monitored by a monitoring device, the method comprising:
 providing environment information regarding the environment of the manipulator system;
 adjusting the protective field based on the environment information; and
 monitoring the adjusted protective field by means of the monitoring device,
 wherein providing environment information comprises the detection of an adjustment signal, and
 wherein the detection of the adjustment signal comprises the scanning of the adjustment signal, wherein the adjustment signal is in the form of an external marking.

9. The method according to claim 5, wherein the adjustment of the protective field comprises switching to a predefined protective field.

10. A manipulator system, comprising:
 a driverless transport system (DTS) having a driverless transport vehicle;
 a monitoring device which is configured to monitor a protective field of the manipulator system;
 a control device, which is configured to:
  obtain environment information regarding the environment of the manipulator system;
  adjust the protective field based on the environment information; and
  monitor the adjusted protective field by means of the monitoring device; and
 means for detecting an adjustment signal,
 wherein the means for detecting the adjustment signal comprises a scanner, which is set up to scan an external marking, and
 wherein the adjustment signal comprises the external marking.

11. The manipulator system according to claim 10, wherein the monitoring device comprises laser scanners for detecting objects in the protective field.

12. The manipulator system according to claim 10, further comprising means for determining the current position of the manipulator system.

13. The manipulator system according to claim 10, further having a stationary transmitter for wirelessly sending the adjustment signal to the means for detecting the adjustment signal, and wherein the means for detecting the adjustment signal comprises a receiver.

14. The method according to claim 1, wherein the manipulator system comprises a manipulator, and wherein the protective field of the manipulator and a DTS-protective field of the driverless transport system are monitored and adjusted.

15. The manipulator system according to claim 10, wherein the manipulator system comprises a manipulator, and wherein the protective field of the manipulator and a DTS-protective field of the driverless transport system are monitored and adjusted.

* * * * *